United States Patent
Hillis

Patent Number: 6,047,396
Date of Patent: Apr. 4, 2000

[54] DIGITAL DATA STORAGE SYSTEM INCLUDING PHANTOM BIT STORAGE LOCATIONS

[75] Inventor: W. Daniel Hillis, Cambridge, Mass.

[73] Assignee: TM Patents, L.P., Boston, Mass.

[21] Appl. No.: 08/548,799

[22] Filed: Nov. 2, 1995

Related U.S. Application Data

[63] Continuation of application No. 07/960,755, Oct. 14, 1992, abandoned.

[51] Int. Cl.[7] .................................................... G06F 11/10
[52] U.S. Cl. ........................... 714/763; 714/768; 714/769
[58] Field of Search .................................. 371/37.1, 37.6, 371/37.4, 37.7, 40.1, 40.2; 714/752, 757, 755, 758, 763, 766, 767, 768–773

[56] References Cited

U.S. PATENT DOCUMENTS

| | | | |
|---|---|---|---|
| 3,622,985 | 11/1971 | Ayling et al. | 371/37.6 |
| 3,814,921 | 6/1974 | Nibby et al. | 371/40.2 |
| 4,809,273 | 2/1989 | Jackowski et al. | 371/37.1 |
| 4,827,478 | 5/1989 | Chan et al. | 371/40.1 |
| 4,926,169 | 5/1990 | Tong et al. | 371/37.1 |
| 4,993,028 | 2/1991 | Hillis . | |

Primary Examiner—Emmanuel L. Moise
Attorney, Agent, or Firm—Cesari and McKenna, LLP

[57] ABSTRACT

A digital data storage arrangement includes a storage register for storing a data word having a predetermined number of data bits along with an error correction code, a data input circuit and a data output circuit. The data input circuit receives an input data word having a number of data bits with at most a selected larger number of data bits than can be stored in said storage register, and generates an error correction code value in response to all of the data bits of said input data word. The data input circuit couples the data word, comprising the predetermined number of data bits of the input data word, along with the error correction code value for storage in the storage register. Thus, if the number of bits of the input data word exceeds the predetermined number of bits that can be stored in the storage register, the storage register only stores the predetermined number of data bits, not all of the bits of the input data word. The data output circuit retrieves the data word and the error correction code from storage register and using the error correction code, generates an output data word which corresponding to the input data word provided by the data input circuit. In particular, the error correction code permits the data output circuit to generate an output data word that includes, in addition to the portion of the input data word that was stored in the storage register, the missing bits that were not stored in the storage register.

17 Claims, 5 Drawing Sheets

FIG. 1

| BIT | CODE WORD | THREE ERRORS | FOUR ERRORS |
|---|---|---|---|
| 0 | 00010011 | 00101111 | |
| 1 | 00010101 | 00101001 | |
| 2 | 00011001 | 00100101 | |
| 3 | 00100011 | 00011111 | |
| 4 | 00010110 | 00001011 | 00111100 |
| 5 | 00011010 | 00000111 | |
| 6 | 00100110 | 00111011 | |
| 7 | 00110111 | 00101010 | |
| 8 | 00011100 | 00101111 | 00011101 |
| 9 | 00101100 | 00011111 | |
| 10 | 00111101 | 00001110 | |
| 11 | 00111110 | 00001101 | |
| 12 | 00110001 | 01001111 | 00110011 |
| 13 | 00110010 | 01001100 | |
| 14 | 00111000 | 01000110 | |
| 15 | 01000101 | 00111011 | |
| 16 | 00110100 | 01001100 | 01111110 |
| 17 | 01000011 | 00111011 | |
| 18 | 01010010 | 00101010 | |
| 19 | 01011101 | 00100101 | |
| 20 | 01001001 | 01111111 | 01111000 |
| 21 | 01001010 | 01111100 | |
| 22 | 01010100 | 01100010 | |
| 23 | 01100001 | 01010111 | |

| BIT | CODE WORD | THREE ERRORS | FOUR ERRORS |
|---|---|---|---|
| 36 | 01110101 | 00101001 | 01011100 |
| 37 | 01111001 | 00100101 | |
| 38 | 10000110 | 11011010 | |
| 39 | 11010110 | 10001010 | |
| 40 | 01111010 | 10111001 | 11000011 |
| 41 | 10000101 | 01000010 | |
| 42 | 10010100 | 01000110 | |
| 43 | 10101000 | 01010111 | |
| 44 | 10001100 | 10010001 | 00011101 |
| 45 | 10010010 | 10001111 | |
| 46 | 10100001 | 10111100 | |
| 47 | 10100010 | 10111111 | |
| 48 | 10011000 | 10110101 | 00101101 |
| 49 | 10011011 | 10110110 | |
| 50 | 10011101 | 10110000 | |
| 51 | 10110011 | 10011110 | |
| 52 | 10100100 | 11001011 | 01101111 |
| 53 | 10100111 | 11001000 | |
| 54 | 10101101 | 11000010 | |
| 55 | 11000001 | 10101110 | |
| 56 | 10111010 | 11100000 | 01011010 |
| 57 | 11000100 | 10011110 | |
| 58 | 11010101 | 10001111 | |
| 59 | 11110001 | 10101011 | |

FIG. 2A

| BIT | CODE WORD | THREE ERRORS | FOUR ERRORS |
|---|---|---|---|
| 24 | 01010001 | 01100010 | 00110011 |
| 25 | 01011000 | 01101011 | |
| 26 | 01011110 | 01101101 | |
| 27 | 01100100 | 01010111 | |
| 28 | 01011011 | 10010111 | 11001100 |
| 29 | 01100111 | 10101011 | |
| 30 | 01110011 | 10111111 | |
| 31 | 10000011 | 01001111 | 11111001 |
| 32 | 01101000 | 10010001 | |
| 33 | 01101110 | 10010111 | |
| 34 | 01110110 | 10001111 | |
| 35 | 10001001 | 01110000 | |

| ECC | | |
|---|---|---|
| 0 | 00000111 | 00001111 |
| 1 | 00001011 | |
| 2 | 00001101 | |
| 3 | 00001110 | |
| 4 | 01110000 | 11110000 |
| 5 | 10110000 | |
| 6 | 11010000 | |
| 7 | 11100000 | |

| BIT | CODE WORD | THREE ERRORS | FOUR ERRORS |
|---|---|---|---|
| 60 | 11000111 | 11111101 | 00111010 |
| 61 | 11001101 | 11110111 | |
| 62 | 11010011 | 11101001 | |
| 63 | 11100011 | 11011001 | |
| 64 | 11001110 | 11001011 | 00000101 |
| 65 | 11011100 | 11011001 | |
| 66 | 11100101 | 11100000 | |
| 67 | 11110010 | 11110111 | |

FIG. 2B

| BIT | CODE WORD | THREE ERRORS | FOUR ERRORS |
|---|---|---|---|
| 0 | 10011101 | 01010100 | |
| 1 | 01100010 | 10101011 | |
| 2 | 11110010 | 00111011 | |
| 3 | 11000100 | 00001101 | |
| 4 | 11100011 | 10101101 | 11001001 |
| 5 | 11011001 | 10010111 | |
| 6 | 01010111 | 00011001 | |
| 7 | 00100011 | 01101101 | 01001110 |
| 8 | 00111000 | 10110110 | |
| 9 | 11111110 | 01110001 | |
| 10 | 01100001 | 11101111 | 10001110 |
| 11 | 00101001 | 10100111 | |
| 12 | 11100101 | 11101001 | |
| 13 | 00111101 | 00110001 | 00001100 |
| 14 | 10010010 | 10011110 | |
| 15 | 01000011 | 01001010 | |
| 16 | 11011100 | 01111111 | 10100011 |
| 17 | 01101110 | 11001101 | |
| 18 | 10000101 | 00100110 | |
| 19 | 10010100 | 00110111 | 11101011 |
| 20 | 01111010 | 10010001 | |
| 21 | 00110100 | 11011111 | |
| 22 | 11111000 | 00010011 | |
| 23 | 01011101 | 10110110 | |

| BIT | CODE WORD | THREE ERRORS | FOUR ERRORS |
|---|---|---|---|
| 44 | 11110111 | 10101011 | 01011100 |
| 45 | 11101010 | 10110110 | |
| 46 | 00101010 | 01110110 | |
| 47 | 01101011 | 00110111 | |
| 48 | 10001010 | 00011001 | 10010011 |
| 49 | 11100011 | 01110101 | |
| 50 | 10100100 | 00110111 | |
| 51 | 01011011 | 11001000 | 00011000 |
| 52 | 11010101 | 11001101 | |
| 53 | 10111111 | 10100111 | |
| 54 | 00010101 | 00001101 | 00100111 |
| 55 | 01100111 | 01111111 | |
| 56 | 01110011 | 01010100 | |
| 57 | 11001110 | 11101001 | 10111000 |
| 58 | 10001100 | 10101011 | |
| 59 | 00010110 | 00110001 | |
| 60 | 10001001 | 00110001 | 11101110 |
| 61 | 10100001 | 00011001 | |
| 62 | 00011111 | 00011001 | |
| 63 | 10001111 | 10110111 | |
| 64 | 10011010 | 01110110 | |
| 65 | 01000011 | 10101101 | |
| 66 | 01111001 | 10010111 | |
| 67 | 01001100 | 10100010 | |

FIG. 3A

| BIT | CODE WORD | THREE ERRORS | FOUR ERRORS |
|---|---|---|---|
| 24 | 01001111 | 01110110 | 00111001 |
| 25 | 01010001 | 01101000 |  |
| 26 | 11010110 | 11101111 |  |
| 27 | 11110001 | 11001000 |  |
| 28 | 10000011 | 00001101 | 10001110 |
| 29 | 11011010 | 01010100 |  |
| 30 | 11111011 | 01110101 |  |
| 31 | 00101100 | 10100010 |  |
| 32 | 10111001 | 10100111 | 00011110 |
| 33 | 10110011 | 10101101 |  |
| 34 | 10111100 | 10100010 |  |
| 35 | 10101000 | 10110110 |  |
| 36 | 11101100 | 01110101 | 10011001 |
| 37 | 00101111 | 10110110 |  |
| 38 | 11110111 | 01101101 |  |
| 39 | 10101110 | 00110111 |  |
| 40 | 00011100 | 01110110 | 01101010 |
| 41 | 10110101 | 11011111 |  |
| 42 | 11111101 | 10010111 |  |
| 43 | 00111110 | 01010100 |  |

| ECC | CODE WORD | THREE ERRORS | FOUR ERRORS |
|---|---|---|---|
| 0 | 00000111 | 00001111 |  |
| 1 | 00001011 |  |  |
| 2 | 00001101 |  |  |
| 3 | 00001110 |  |  |
| 4 | 01110000 | 11110000 |  |
| 5 | 10110000 |  |  |
| 6 | 11010000 |  |  |
| 7 | 11100000 |  |  |

| BIT | CODE WORD | THREE ERRORS | FOUR ERRORS |
|---|---|---|---|
| 68 | 10111010 | 01010100 | 11101110 |
| 69 | 10011011 | 01110101 |  |
| 70 | 10000110 | 01101000 |  |
| 71 | 01001001 | 10100111 |  |
| 72 | 11010011 | 00100110 | 11110101 |
| 73 | 01100100 | 10010001 |  |
| 74 | 01011000 | 10101101 |  |
| 75 | 00011010 | 11101111 |  |
| 76 | 11000001 | 01110101 | 10110100 |
| 77 | 11001011 | 01111111 |  |
| 78 | 11000010 | 01110110 |  |
| 79 | 01111100 | 11001000 |  |
| 80 | 11000111 | 01010010 | 10010101 |
| 81 | 00100101 | 01010000 |  |
| 82 | 01000101 | 11010000 |  |
| 83 | 00110010 | 10100111 |  |

FIG. 3B

DIGITAL DATA STORAGE SYSTEM INCLUDING PHANTOM BIT STORAGE LOCATIONS

This is a continuation of application Ser. No. 07/960,755, filed on Oct. 14, 1992 now abandoned.

FIELD OF THE INVENTION

The invention relates generally to the field of digital data storage systems and more particularly to data storage systems which use error detection and correction codes. The invention provides an arrangement using an error detection and correction code which can selectively facilitate (a) the emulation of additional "phantom" bit storage locations than are actually provided to store a data word and additionally facilitate the detection of an error, or alternatively (b) the detection and correction of an error in the data word.

BACKGROUND OF THE INVENTION

While digital computers can process data very quickly, it is generally recognized that the utility of the result is no better than the reliability of the data. That is, if the data that is processed by the computer is corrupted before or during processing, the resulting processed data will generally reflect the corruption. Accordingly, several arrangements have been developed to facilitate the detection and correction of errors which may develop in the data.

One relatively simple arrangement is to use one extra "parity" bit added to the binary representation of each data word. The value of the parity bit is a function of the condition of the other bits of the data word, and may reflect, for example, the number of bits in the binary representation whose value is "one." That is, if an even number of bits in the binary representation have the value "one," the parity bit may also have the value "one," but if an odd number of bits have the value "one," the parity bit will have the value "zero." If, when the computer is to later use the augmented data word (that is, the original data word with the parity bit appended), it determines that the number of bits having the value "one" differs from the number indicated by the parity bit, it can conclude that an error has occurred in the augmented data word. It will be appreciated that, since the value of the parity bit is to reflect whether the number of "ones" in the original data word is even or odd, a change of any one bit in the augmented data word, including the parity bit, from a "one" to a "zero," or from a "zero" to a "one," will trigger an error indication. It will be further appreciated that use of such a parity bit will not protect against a two-bit error, since the even-ness or odd-ness of the number of "ones" will be the same.

In addition, the use of a parity bit will not help identify the location of an error if one is detected. Accordingly, while use of a parity bit will help in error detection, it will not help in error correction. To assist in error correction, error correction coding techniques have been developed to provide additional error correction bits which can indicate the presence of, and facilitate the location of, errors in a data word. Generally, for each data word to be protected, a multiple-bit error correction code is generated and added to the data word to form the augmented data word. The particular number of errors which may be detected and corrected will depend on particular encoding techniques which are used. Generally, for a data word of a given size, the more errors which may be detected and corrected in the data word, the more bits are required in the associated code word. When the computer is to later use the data word, it and the associated error correction code are processed to determine if any errors developed prior to processing. If so, a "syndrome" is generated which identifies the particular erroneous bit of the data word.

Both parity and error correction code techniques are often used in the same computer. For example, error correction coding may be used in data storage, since greater confidence in data integrity may be required, the additional bit storage is relatively inexpensive, and the likelihood of an error is relatively high. On the other hand, parity may be used in buses used to transmit data between the storage subsystem and processor, since the additional lines used to carry the data may be expensive, buses are relatively reliable and, if an error is detected in transmission, the transmission can be repeated without loss of the data.

SUMMARY OF THE INVENTION

The invention provides a new and improved digital data storage arrangement using an error detection and correction code which can selectively facilitate (a) the emulation of additional "phantom" bit storage locations than are actually provided to store the data and additionally facilitate the detection of an error, or alternatively (b) the detection and correction of an error.

In brief summary, the new digital data storage arrangement includes a storage register for storing a data word having a predetermined number of data bits along with an error correction code, a data input circuit and a data output circuit. The data input circuit receives an input data word having a number of data bits with at most a selected larger number of data bits than can be stored in said storage register, and generates an error correction code value in response to all of the data bits of said input data word. The data input circuit provides the data word, which is to be stored in the storage register, comprising the predetermined number of data bits of the input data word, along with the error correction code value, to be stored in the storage register as an error correction code. Thus, if the number of bits of the input data word exceeds the predetermined number of bits that can be stored in the storage register, the storage register only stores the predetermined number of data bits, not all of the bits of the input data word. The data output circuit retrieves the data word and the error correction code from storage register and performs an error correction operation in connection therewith. The result is an output data word which corresponding to the input data word provided by the data input circuit. In particular, the error correction code permits the data output circuit to generate an output data word that includes, in addition to the portion of the input data word that was stored in the storage register, the missing bits that were not stored in the storage register.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A, 2B, 3A and 3B are diagrams depicting error detection and correction encodings which may be useful in a storage arrangement as depicted in FIG. 1.

DETAILED DESCRIPTION OF AN ILLUSTRATIVE EMBODIMENT

Figure 1:
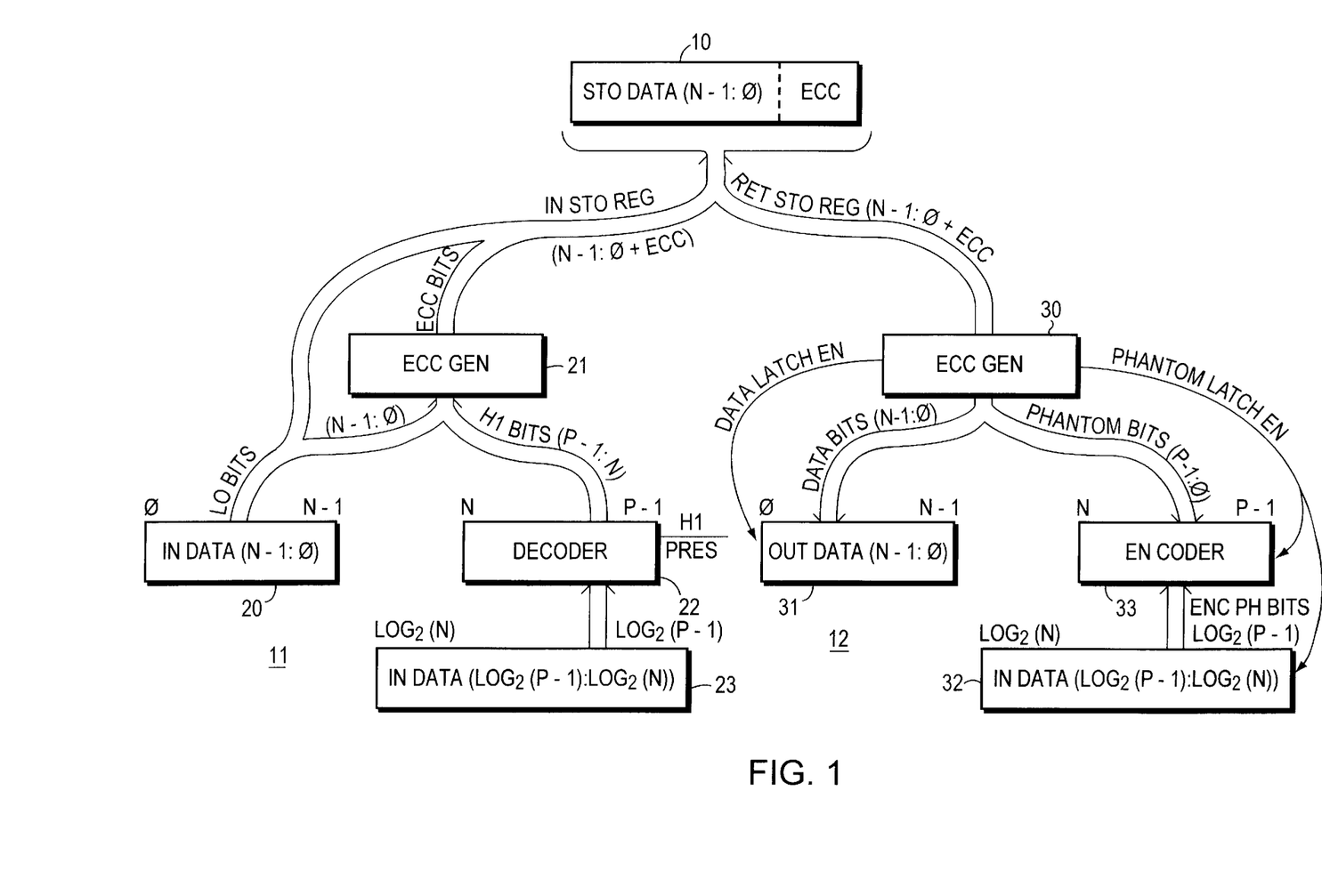
FIG. 1 depicts a functional block diagram of a storage arrangement in accordance with the invention.

FIG. 1 depicts a functional block diagram of a storage arrangement in accordance with the invention. The storage arrangement provides a storage register which can accommodate a predetermined number "N" of data bits, plus error correction code ("ECC") bits, and using an error correction code which can provide a predetermined degree of error detection and correction with respect to the number of stored data, provides the ability to:

(i) emulate the storage of a data word with a predetermined number of additional bits and reconstruct the entire emulated stored data word when the contents of the storage register are to be retrieved, with some reduction in the degree of error detection and correction provided by the ECC bits, or, alternatively, (ii) if all of the non-stored portion of the data word have bits with the value zero or are otherwise not provided, for the N bits comprising the data word which is actually stored provide the full degree of error detection and correction.

With reference to FIG. 1, the storage arrangement includes a storage register 10, an ECC encoding portion 11 and an ECC decoding portion 12. The ECC encoding portion receives an "N" bit input data word IN DATA (N−1:0) at a register 20, which provides LO BITS (N−1:0) signals to an error correction code generator 21. The error correction code generator 21 generates ECC BITS error correction code bit signals in response to the LO BITS (N−1:0) signals and also in response to HI BITS (P−1:N) signals from a decoder 22, specifically generating the ECC BITS signals in response to the specific ones of the LO BITS (N−1:0) and HI BITS (P−1:N) signals which are asserted, that is, which have the logical value "one." The LO BITS (N−1:0) signals and ECC BITS signals are also jointly coupled as IN STO REG (N−1:0+ECC) input storage register signals to the storage register 10, which latches them as a stored data and ECC word STO DATA (N−1:0+ECC).

If a register 23 is storing data DATA (LOG$_2$(P−1):LOG$_2$(N)) representing a binary encoded value having Log$_2$(P−1)-LOG$_2$(N) bits, which may be indicated by the assertion of a HI PRES high bits present signal, the decoder 22 receives ENC HI BITS (LOG$_2$(P−1):LOG$_2$(N)) encoded high bits signals from the register 23. In response, the decoder 22 generates the HI BITS (P−1:N) signals, representing the decoded value. In particular, the decoder 22 generates a plurality of HI BITS (i) signals, each having an index "i" associated with a binary-encoded value of the ENC HI BITS (LOG$_2$(P−1):LOG$_2$(N)) encoded high bits signals. Upon receipt of the ENC HI BITS (LOG$_2$(P−1):LOG$_2$(N)), the decoder 22 will provide one asserted HI BITS (i) signal (P−1≧i≧N) with the value "one," and the others having the value "zero." Thus, if any of the HI BITS (P−1:N) signals has the value "one", the error correction code generator will use that signal in generating the ECC BITS error correction code bits.

On the other hand, if none of the HI BITS (P−1:N) signals is asserted, which will be the case if the register 23 is not storing data, the HI PRES signal will be negated and so the decoder will generate HI BITS (P−1:N) signals all of which represent the bit value "zero." In this condition, since none of the HI BITS (P−1:N) signals have the value "one," they will have no effect on the ECC BITS signals generated by the error correction code generator 21. That is, the ECC BITS signals generated by the error correction code generator 21 will only reflect the condition of the LO BITS (N−1:0) signals, and specifically those of the LO BITS (N−1:0) signals which represent the bit value "one."

As noted above, the storage register 10 latches the IN STO REG (N−1:0+ECC) input storage register signals, representing the LO BITS (P−1:0) signals from the register 20 and the ECC BITS signals from the error correction code generator 21. Thus, the contents of register 20 reflect the "N" bit data word IN DATA (N−1:0) provided by the register 20 and the error correction code bits generated by the error correction code generator 21 in response to that data word DATA (N−1:0) and any data word DATA (LOG$_2$(P−1):LOG$_2$(N)) contained in register 23. However, the "P-N " bit data word defined by the HI BITS (P−1:N) signals from decoder 22, representing the decoding of data word DATA (LOG$_2$(P−1):LOG$_2$(N)) from register 23, is not stored in the storage register 10. It will be appreciated that the fact that the data word from register 23 is not stored in the storage register is essentially logically equivalent to implicitly storing it as phantom bits with all of the bits constrained to having the value "zero," or some other predetermined value.

The ECC decoding portion 12 includes an error correction code check circuit 30, registers 31 and 32 and an encoder 33. The register 31 is used to receive DATA BITS (N−1:0) signals from the error correction code check circuit 30, which it stores as an "N" bit data word OUT DATA, (N−1:0), and which correspond to the data word originally provided by the register 20 of the ECC encoding portion 11. The register 32 is used to receive ENC PH BITS (LOG$_2$(P−1):LOG$_2$(N)) encoded phantom bits if a data word IN DATA (LOG$_2$(P−1):LOG$_2$(N)) was originally provided by register 23 to error correction code generator 21. The error correction code check circuit 30 indicates the presence of DATA BITS (N−1:0) signals to be latched by the register 31 by asserting a DATA LATCH EN data latch enable signal. Similarly, the error correction code check circuit 30 indicates that register 32 is to latch a data word by asserting a PHANTOM LATCH EN phantom latch enable signal.

When the contents of the storage register 10, that is, the stored data word STO DATA, (N−1:0) and the ECC, are to be retrieved, they are transferred as RET STO REG (N−1:0ECC), retrieved storage register signals to the ECC decoding portion 12, and in particular to the error. Correction code check circuit 30. The RET STO REG (N−1:0+ECC) signals comprise RET STO REG (N−1:0) signals representing the "N" bit data word STO DATA (N−1:0) previously stored in the register 10, as well as RET STO REG (ECC) signals representing the error correction code bit; previously stored in the storage register 10. It will be appreciated that each bit STO DATA (i) of the data word STO DATA (N−1:0) stored in register 10 will be transferred as a correspondingly-indexed RET STO REG (N−1:0) signals, and similarly each of the ECC bits will be transferred as a corresponding one of the RET STO REG (ECC) signals.

The error correction code check circuit uses all of the RET STO REG (N−1:0+ECC) retrieved storage register signals to, as described below, generate an error correction syndrome. If the syndrome is zero, there is no error in any of the bits. In that case, the RET STO REG (N−1:0+ECC) signals represent only data bits comprising the data word IN DATA (N−1:0) originally provided by the register 20 in the ECC encoding portion 11, and so the error correction code check circuit 30 generates the DATA BITS (N−1:0) signals which it provides to the register 31, and in addition asserts the DATA LATCH EN data latch enable signal to enable the register 31 to latch the signals as the data word OUT DATA (N−1:0)

On the other hand, if the error correction syndrome is not zero, the operations performed by the error correction code check circuit 30 will depend on the value of the error correction syndrome which was generated. The particular value of the syndrome may, as will be described below in connection with FIGS. 2A through 3B, identify a particular one of the RET STO REG (N−1:0+ECC) retrieved storage register signals which provided the error resulting in the non-zero syndrome. If the syndrome identifies a bit "i" in the stored data word STO DATA (N−1:0) from register 10, that identification indicates that the value indicated by the correspondingly-received RET STO REG (i) signal was in error, and to correct the error the error correction code check circuit 30 can provide a DATA BITS (i) signal for storage in the register 31 which represents a bit value that corresponds to the complement of the bit value represented by the RET STO REG (i) signal received from storage register 10.

However, if the error correction syndrome generated by the error correction code check circuit 30 identifies one of the ECC bits, reflecting an error in the STO REG (ECC) signals received from the storage register 10, the error correction code check circuit 30 need do nothing, since the ECC bits will not be used thereafter.

Finally, the error correction syndrome generated by the error correction code check circuit 30 may alternatively identify another bit "i" in the range "P−1" to "N," which bit will correspond to one of the phantom bits in the data word IN DATA ($LOG_2(P-1):LOG_2(N)$) originating from register 23 of the ECC encoding portion 11. It will be recalled that these bits were not stored in the storage register 10, but their values were used in generating the ECC error correction code which was stored. In that case, the error correction code check circuit 30 will assert one of the PHANTOM BITS (P−1:N) signals, namely, the PHANTOM BITS (i) signal identified by the error correction syndrome, with the asserted signal representing a bit with the value "one." The error correction code check circuit 30 will also assert a PHANTOM LATCH EN signal which will enable the encoder 33 to receive the PHANTOM BITS (P−1:N) signals and generate binary-encoded ENC PH BITS ($LOG_2(P-1):LOG_2(N)$) encoded phantom bits signals to be latched in the register 32 as data word OUT DATA ($LOG_2(P-1):LOG_2(N)$). It will be appreciated that the error correction code check circuit 30 will assert the PHANTOM LATCH EN signal if any of the PHANTOM BITS (P−1:N) signals is asserted, and so the PHANTOM LATCH EN signal may comprise the logical OR of the PHANTOM BITS (P−1:N) signals. It will further be appreciated that the data word OUT DATA ($LOG_2(P-1):LOG_2(N)$) will contain the same value as that provided by the register 23 of the ECC encoding portion 11.

It will be appreciated that the storage arrangement depicted in FIG. 1 has the ability, as indicated above, with a storage register which can accommodate a predetermined number "N" of data bits, plus error correction code ("ECC") bits, and using an error correction code which can provide a predetermined degree of error detection and correction with respect to the number of stored data emulate the storage of a data word with a predetermined number of additional bits and reconstruct the entire emulated stored data word when the contents of the storage register are to be retrieved, with some reduction in the degree of error detection and correction provided by the ECC bits. The reduction in the degree of error detection and correction provided by the ECC bits arises from the fact that the ECC bits are used to construct the values of the bits of the portion of the data word which is not stored. If all of the data word has "N" bits, or equivalently if the non-stored portion of the data word is constrained such that all bits have the value the value zero, the ECC bits will provide the full degree of error detection and correction for the "N" bit data word.

The storage arrangement depicted in FIG. 1 provides a number of advantages. First, the arrangement facilitates the storage of larger data words in a than can actually be accommodated by the arrangement's storage register, which can enhance storage efficiency. Since the emulated storage of the additional bits results in a reduction in the degree of error detection and correction, it may be advantageous to provide the additional bits generally rarely, and in particular to use them to identify a trap when the particular storage register is referenced during debugging, for example. The value represented by the OUT DATA ($LOG_2(P-1):LOG_2(N)$) data word provided by the phantom bits may be used to identify a particular trap or exception to be processed during debugging.

It will be further appreciated that the decoder 22 is provided to accommodate that data word provided through register 23 will have a binary-encoded form, and encoder 33 is provided if it is desired that the data word stored in register 32 have a binary-encoded form. If the data word provided through register 23 is not in binary-encoded form, but is already fully decoded, such that only one of the bits will have the value "one" at any one time, the decoder 22 is not necessary. Complementarily, if the word provided through register 32 is to be in decoded (not binary-encoded) form, the encoder 33 need not be provided, and instead the error correction code check circuit may connect directly to the register 32.

Figure 2B:
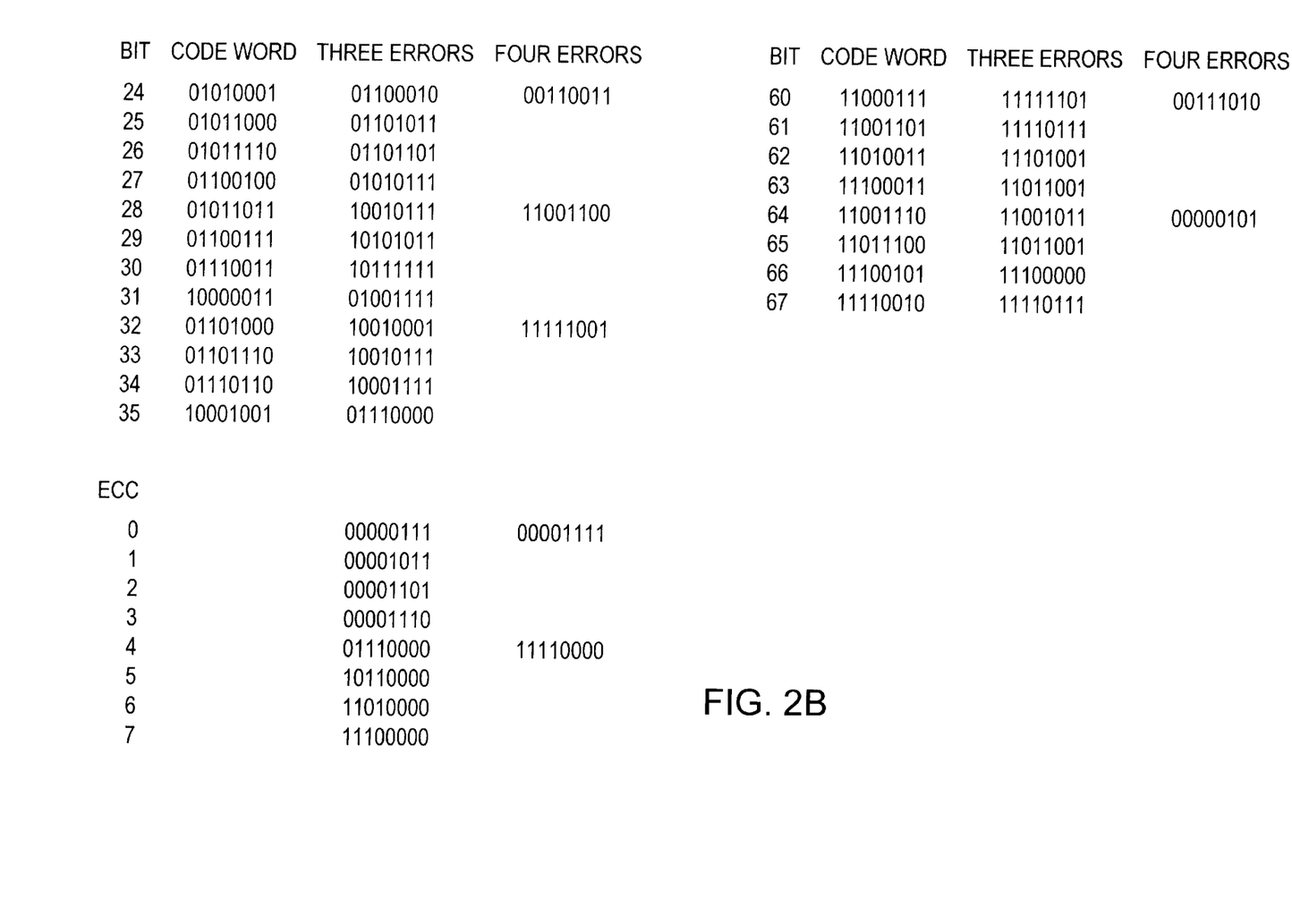

FIGS. 2A through 3B depict details of two error correction and detection encodings which are useful in the storage arrangement depicted in FIG. 1. FIGS. 2A and 2B depict details of an encoding which can accommodate data words having sixty-eight bits (67:0) with eight error correction code bits. Accordingly, the encoding can accommodate data words DATA (N−1:0) from register 20 of, for example, sixty four bits (63:0) as well as four phantom bits to be provided through register 23 and decoder 22, so that a data word stored in register 23 may have a binary-encoded form with two bits. FIGS. 2A and 2B comprise a table having four columns entitled "Bit," "Code Word," "Three Errors," and "Four Errors." Each row of the table is, as indicated by the value in the "Bit" column, associated with one bit "i" of the data word DATA (N−1:0), for 0<i<63, and the remaining four rows are associated with the phantom bits representative of the data word IN DATA ($LOG_2(P-1):LOG_2(N)$) received through register 23 and decoder 22. In each row, the entry in the "Code Word" column identifies a bit pattern represented by values "one" and "Zero," which the error correction code generator uses in generating the eight-bit error correction code. Specifically, the error correction code generator 21, in a conventional manner, performs a logical exclusive-OR operation in connection with the bit patterns in the "Code Word" column of the bits "i" of the data word and phantom bits which have the value "one" to generate the error correction code bits. Accordingly, it will be appreciated that, since the error correction code generator 21 use only the bit patterns in entries in the code word column for the data word bits or phantom bits which have the value "one," the error correction code generator 21 will generate the same error correction code if no phantom bits are present and if all of the phantom bits have the value "zero."

The error correction code check circuit 30 also uses the bit patterns in the Code Word column of the bits represented by the RET STO REG (N−1:0+ECC) retrieved storage word signals to perform error detection and correction and to regenerate the phantom bits. In particular, the error correction code check circuit uses the bit patterns in the "Code Word" column of the entries associated with the bits of the data word DATA (N−1:0) which have the value "one," as indicated by the asserted or negated condition of the corresponding bits of the RET STO REG (N−1:0) retrieved storage register signals, performs an exclusive-OR operation in connection therewith, and additionally performs an exclusive-OR operation using the ECC bits from storage register 10 as represented by the RET STO REG (ECC) signals. It will be appreciated that, if the result of the exclusive-OR operations in connection with the bit patterns in the Code Word column for the bits of the data word DATA (N−1:0) in storage register 10 which have the value "one" corresponds to the ECC bits retrieved from storage register 10, which will occur if there were no errors and no phantom bits, a further exclusive-OR operation using the ECC bits will provide the value zero. Thus, if the error correction code check circuit 30 determines that the result of all of the exclusive-OR operations is zero, the RET STO REG (N−1:0) signals correctly represents the data word that was loaded into the storage register 10.

If, on the other hand, the error correction code check circuit 30 determines that the result of all of the exclusive-OR operations is not zero, as described above its subsequent operations depend on the resulting bit pattern. If the resulting bit pattern instead corresponds to the bit pattern in the Code Word column associated with a bit "i" of data word DATA (N−1:0), that condition indicates that the bit "i" is in error, that is, it has the value "one" when it should be "zero," or "zero" when it should be "one." The fact that the same bit pattern is used for both constructing the ECC bits and verifying the result and identifying the erroneous bits follows from the fact that:

(i) if a bit of the retrieved data word, as represented by the RET STO REG (N−1:0) signals, has the value "one" when it should have the value "zero," it will be appreciated that the error correction code generator 21 would not have used the bit's bit pattern in generating the ECC bits for storage in the storage register. Accordingly, the exclusive-OR operations performed by the error correction code check circuit 30 in connection with the bit patterns for the other bits of the retrieved data word with value of "one" along with the ECC bits would result in a zero value. The non-zero result, therefore, corresponds to the bit pattern of the erroneous bit; and (ii) if a bit of the retrieved data word, as represented by the RET STO REG (N−1:0) signals, has the value "zero" when it should have the value "one," during the check operation the error correction code check circuit 30 will not use the bit's associated bit pattern from the Code Word column in performing the exclusive-OR operations. Since the ECC bits as generated by the error correction code generator 21 reflect also the bit pattern for the erroneous bit, the result of the exclusive-OR operations by the error correction code check circuit, which does not use the bit pattern for the erroneous bit in the check operation, will constitute the bit pattern for the missing bit.

Similarly, if the resulting bit pattern generated by the error correction code check circuit 30 corresponds to the bit pattern in the Code Word column associated with a bit of the phantom bits, that will be an indication that the associated phantom bit has the value "one." This follows from the fact that, if any of the HI BITS (P−1:N) signals provided by decoder 22 had reflected a value "one" for the corresponding phantom bit, the phantom bit's associated bit pattern from the Code Word column in FIGS. 2A and 2B had been used by the error correction code generator 21 in generating the ECC bits stored in storage register 10. Accordingly, if the error correction code check circuit 30, in the error correction check operation, develops a result which corresponds to the bit pattern in the Code Word column of a phantom bit, that is an indication of an error in that phantom bit. As with the other bits, represented by the RET STO REG (N−1:0) retrieved storage register signals, as described above, that condition indicates that the corresponding phantom bit is in error, and, since the result reflects the fact that the error correction code check circuit 30 had not used the phantom bit's Code Word bit pattern in the exclusive-OR operation, reflecting a presumed "zero" value for the phantom bit, the error correction code check circuit 30 determines from that result that the correct value of the phantom bit is "one." The error correction code check circuit 30 will provide PHANTOM BITS (P−1:N) signals reflecting that result, and will assert the PHANTOM LATCH EN phantom latch enable signal as described above.

The error correction encoding depicted in FIGS. 2A and 2B also facilitates the correction of additional numbers of errors by means of bit patterns as shown in columns headed "Three Errors" and "Four Errors." In both cases, the bit patterns indicate the presence of multiple errors in a nibble, that is, in a series of four successive bits zero through three of a data word DATA (3:0), bits four through seven of a data word DATA (7:4), and so forth, up through the nibbles comprising the phantom bits. In particular, if the error correction code generator 21 generates the ECC bits as described above using the bit patterns in the Code Word column, and if the error correction code check circuit 30 generates a result having a bit pattern corresponding to a bit pattern in the Three Errors column, that is an indication that the other three bits in the nibble including the bit are in error. Accordingly, it will be appreciated that those three bits can be corrected by complementing all three of them. Similarly, if the error correction code check circuit 30 generates a result having a bit pattern corresponding to a bit pattern in the Four Errors column, that is an indication that all four bits in the nibble are in error, in which case all four bits can be corrected by complementing them. It will be appreciated that the bit pattern in each entry in the Three Errors column is the exclusive-OR of the bit patterns in the Code Word column of the other three bits in each nibble, as shown in the table in FIGS. 2A and 2B. Similarly, the bit pattern in each entry in the Four Errors column is the exclusive-OR of the bit patterns of all of the bits in each nibble.

The correction of three or four errors in a four-bit nibble can be particularly helpful in connection with storage subsystems which include random access memory chips which store bits in a "by-four" manner. That is, instead of "by-one" storage, in which each bit DATA (i) from a data word DATA (N−1:0) is stored in a different random access memory chip, which would require seventy-two chips, including sixty-four chips for the sixty-four bits of the data word DATA (63:0) and eight chips for the eight ECC bits, in "by-four" storage all of the bits comprising each nibble are stored in a chip so that only sixteen chips are required for the data word and two chips are required for the ECC bits. The facility to correct three- and four-bit errors in a nibble is advantageous in that it permits the recovery of data words even if an entire memory chip were to fail with the loss of the nibble contained therein.

Figure 3A:
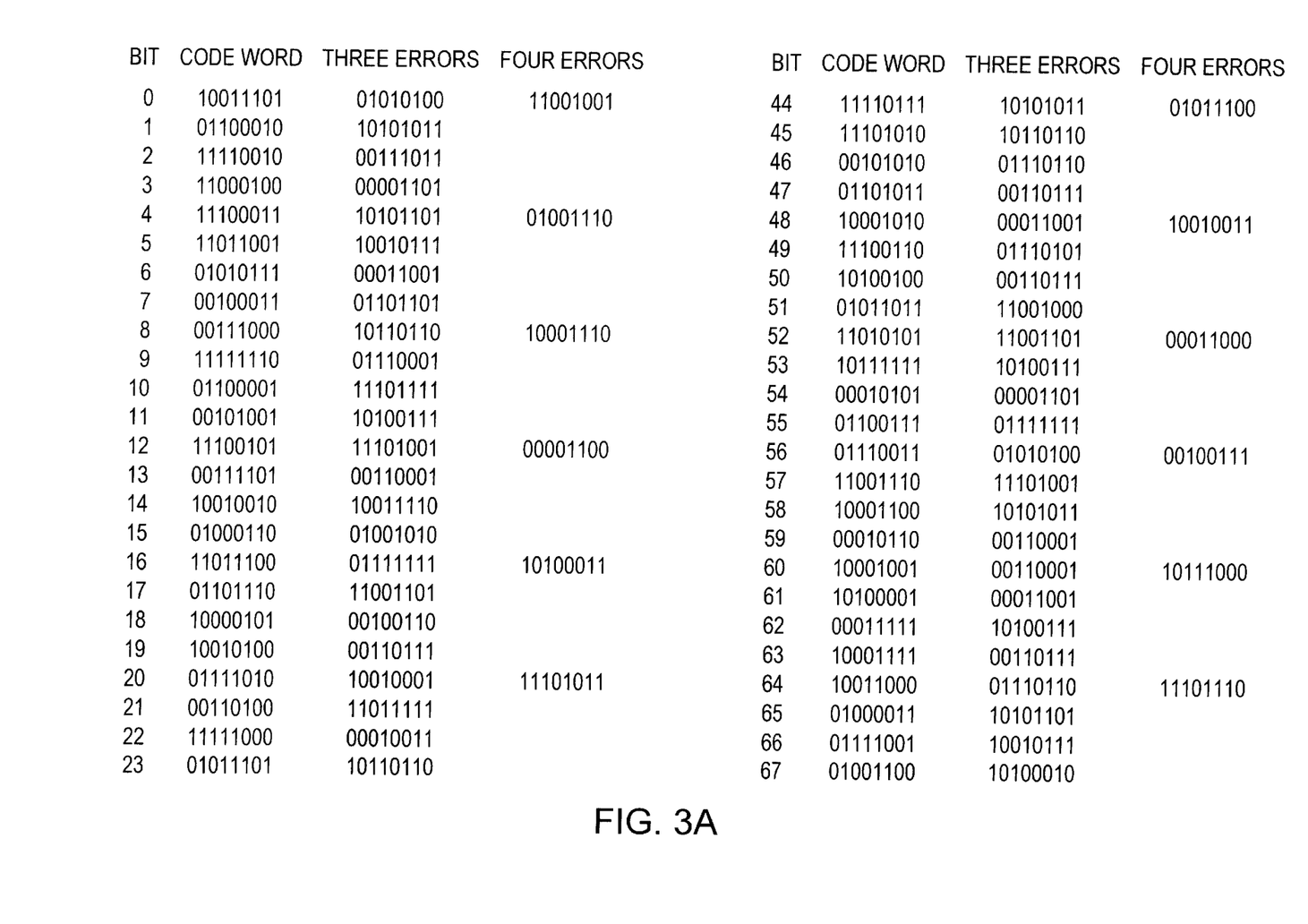
Figure 3B:
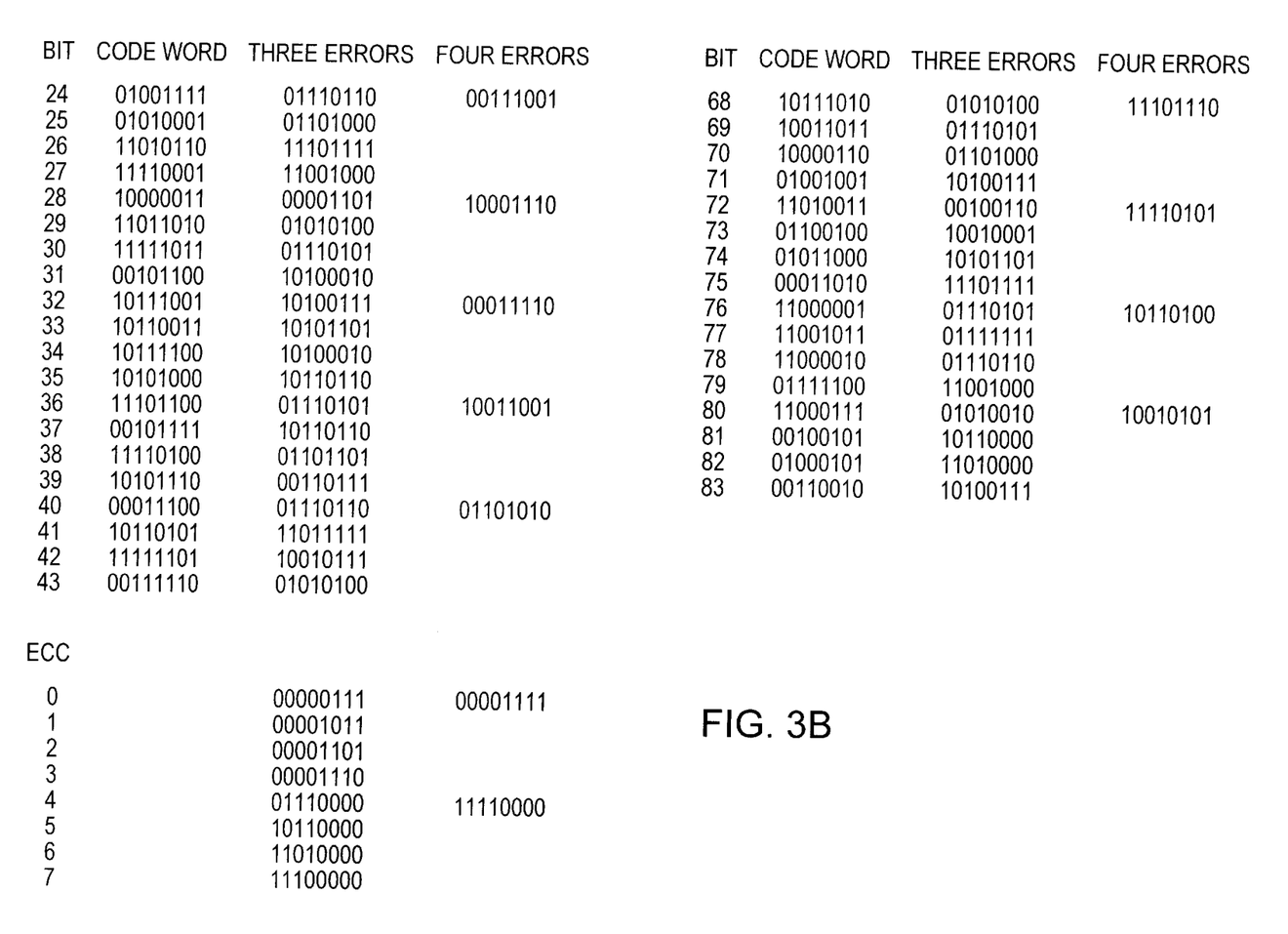

FIGS. 3A and 3B depict a table detailing an error correction encoding having similar features as those described above in connection with FIGS. 2A and 2B, except that the encoding will accommodate up to eighty-four bits. The encoding depicted in FIGS. 3A and 3B will, therefore, accommodate, for example, a data word DATA (63:0) having sixty-four data bits along with twenty phantom bits comprising bits sixty-four through eighty-three. As with the table depicted in FIGS. 2A and 2B, the table depicted in FIGS. 3A and 3B comprises four columns, having the same headings Bit,"° Code Word," Three Errors," and "Four Errors" with the entries in each column having bit patterns used as described above in connection with FIGS. 2A and 2B.

With the encodings depicted in FIGS. 2A through 3B, it is well within the ability of anyone skilled in the art to develop exclusive-OR circuitry useful in the error correction code generator 21 and error correction code check circuit 30 (FIG. 1), and so specific circuitry for using the encodings depicted in FIGS. 2A through 3B will not be detailed herein. It will also be appreciated that the encodings depicted in FIGS. 2A through 3B will be useful in connection with other storage arrangements than that described above in connection with FIG. 1, and in particular may be used in a storage arrangement in which all of the bits of an input data word are stored.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage system comprising:
    A. a storage register for storing a data word having a predetermined number of data bits along with an error correction code;
    B. a data input circuit for receiving an input data word having a number of data bits having a selected larger number of data bits than can be stored in said storage register and for generating an error correction code value in response to all of the data bits of said input data word, said data input circuit providing the data word for storage in said storage register comprising the predetermined number of data bits of said input data word along with the error correction code value, the error correction code value being stored in said storage register as an error correction code; and
    C. a data output circuit for retrieving the data word and the error correction code stored in said storage register and for performing an error correction operation in connection therewith to generate an output data word corresponding to the input data word provided by the data input circuit, said output data word having the number of data bits of the input data word.

2. A storage system as defined in claim 1 wherein said data input circuit comprises:
    A. a low-order input portion for providing a low-order data word portion of said input data word;
    B. a high-order input portion for receiving a high-order data word portion of said input data word;
    C. an error correction code generator for generating said error correction code value in response to a composite data word comprising the high-order data word portion from the high-order input portion concatenated to the low order data word portion from said low-order input portion; and
    D. coupling means for coupling at least said low-order data word portion and said error correction value to said storage register for storage therein.

3. A storage system as defined in claim 2 in which said low-order input portion comprises a low-order register for storing said low-order data word portion.

4. A storage system as defined in claim 3 in which the low-order data word portion stored by the low-order register comprises a number of bits corresponding to the predetermined number of data bits stored by said storage register.

5. A storage system as defined in claim 2 in which said high-order input portion comprises a high-order register for storing said high-order data word portion.

6. A storage system as defined in claim 2 in which said high-order portion comprises:
    A. a high-order register for storing an encoded high-order data word portion, the encoded high-order data word portion having a binary-encoded value; and
    B. a decoder for receiving the encoded high-order data word portion stored in said high-order register and generating a decoded high-order data word portion, the decoder generating the decoded high-order data word portion to have a number of concatenated bits HI BITS (i), "i" being an index, the decoder asserting one of said concatenated bits HI BITS (I), where "I" has a selected relation to the binary-encoded value of the encoded high-order data word portion.

7. A storage system as defined in claim 1 wherein said data output circuit comprises:
    A. an error correction code decoder for receiving the data word and the error correction code stored in said storage register and for performing an error correction operation in connection therewith to generate an output data word, the output data word comprising a low-order output data word and a high-order output data word portion;
    B. a low-order output portion for receiving the low-order output data word portion from said error correction code decoder; and
    C. a high-order output portion for receiving the high-order output data word portion from said error correction code decoder.

8. A storage system as defined in claim 7 in which said low-order output portion comprises a low-order register for storing said low-order output data word portion.

9. A storage system as defined in claim 8 in which the low-order data word portion stored by the low-order register comprises a number of bits corresponding to the predetermined number of data bits stored by said storage register.

10. A storage system as defined in claim 7 in which said high-order output portion comprises a high-order register for storing said high-order output data word portion.

11. A storage system as defined in claim 7 in which said high-order output portion comprises:
    A. an encoder for receiving the high-order output data word portion stored in said highorder register and generating an encoded high-order data word portion, the high-order output data word portion having a number of concatenated bits HI BITS (i), "i" being an index, with one of said concatenated bits HI BITS (I) being asserted, the encoder generating an encoded high-order output data word portion having a binary-encoded value having a selected relation to index "I"; and
    B. a high-order output register for storing said encoded high-order output data word portion.

12. A digital data storage system comprising:
    A. a storage register for storing a data word having a predetermined number of data bits along with an error correction code;
    B. a data input circuit comprising:
        i. a low-order input portion for providing a low-order data word portion of an input data word;

ii. a high-order input portion comprising:
  a. a high-order register for storing an encoded high-order data word portion of said input data word, the encoded high-order data word portion having a binary-encoded value; and
  b. a decoder for receiving the encoded high-order data word portion stored in said high-order register and generating a decoded high-order data word portion, the decoder generating the decoded high-order data word portion to have a number of concatenated bits HI IN BITS (i), "i" being an index, the decoder asserting one of said concatenated bits HI IN BITS (I), where "i" has a selected relation to the binary-encoded value of the encoded high-order data word portion;
iii. an error correction code generator for generating said error correction code value in response to a composite data word comprising the high-order data word portion from the high-order input portion concatenated to the low order data word portion from said low-order input portion; and
iv. coupling means for coupling at least said low-order data word portion and said error correction value to said storage register for storage therein;
C. a data output circuit comprising:
  i. an error correction code decoder for receiving the data word and the error correction code stored in said storage register and for performing an error correction operation in connection therewith to generate an output data word, the output data word comprising a low-order output data word and a high-order output data word portion;
  ii. a low-order output portion for receiving the low-order output data word portion from said error correction code decoder; and
  iii. a high-order output portion comprising:
    a. an encoder for receiving the high-order output data word portion stored in said high-order register and generating an encoded high-order data word portion, the high-order output data word portion having a number of concatenated bits HI OUT BITS (i), "i" being an index, with one of said concatenated bits HI OUT BITS (I) being asserted, the encoder generating an encoded high-order output data word portion having a binary-encoded value having a selected relation to index "I"; and
    b. a high-order output portion for receiving said encoded high-order output data word portion.

13. A data storage method for storing a data word in a storage register, the storage register having a capacity of a predetermined number of data bits along with an error correction code, the method comprising the steps of:
  A. receiving the input data word having a number of data bits having a selected number of data bits, the selected number being larger than said predetermined number, and generating an error correction code value in response to all of the data bits of said input data word;
  B. storing in said storage register a portion of said input data word, the portion corresponding to the predetermined number of data bits, and the error correction code; and
  C. retrieving the data word and the error correction code stored in said storage register and performing an error correction operation in connection therewith to generate an output data word corresponding to the input data word, said output data word having the number of data bits of the input data word.

14. A digital data storage system comprising:
a storage register for storing a data word having a predetermined number of data bits along with an error correction code;
a data input circuit for receiving an input data word having a number of data bits having a selected larger number of data bits than can be stored in said storage register, and for generating an error correction code value in response to all of the data bits of said input data word, said data input circuit providing the data word for storage in said storage register comprising the predetermined number of data bits of said input data word along with the error correction code value, the error correction code value being stored in said register as an error correction code; and
a data output circuit for retrieving the data word and the error correction code stored in said storage register, and for performing an error correction operation in connection therewith to generate an output data word corresponding to the input data word provided by the data input circuit, said output data word having the number of data bits of the input data word,
wherein said data input circuit comprises:
  a low-order input portion for providing a low-order data word portion of said input data word;
  a high-order input portion for receiving a high-order data word portion of said input data word;
  an error correction code generator for generating said error correction code value in response to a composite data word comprising the high-order data word portion from the high-order input portion concatenated to the low order data word portion from said low-order input portion; and
  coupling means for coupling at least said low-order data word portion and said error correction value to said storage register for storage therein,
  in which said high-order portion comprises:
    a high-order register for storing an encoded high-order data word portion, the encoded high-order data word portion having a binary-coded value; and
    a decoder for receiving the encoded high-order data word portion stored in said high-order register and generating a decoded high-order data word portion, the decoder generating the decoded high-order data word portion to have a number of concatenated bits HI BITS (i), "i" being an index, the decoder asserting one of said concatenated bits HI BITS (I), where "I" has a selected relation to the binary-encoded value of the encoded high-order data word portion.

15. A digital data storage system comprising:
a storage register for storing a data word having a predetermined number of data bits along with an error correction code;
a data input circuit for receiving an input data word having a number of data bits having a selected larger number of data bits than can be stored in said storage register, and for generating an error correction code value in response to all of the data bits of said input data word, said data input circuit providing the data word for storage in said storage register comprising the predetermined number of data bits of said input data word along with the error correction code value, the error collection code value being stored in said register as an error correction code; and a data output circuit for retrieving tile data word and the error correction code stored in said storage register, and for performing an error correction operation in connection therewith to generate an output data word corresponding to the input data word provided by the data input circuit, said output data word having the number of data bits of the input data word, wherein said data output circuit comprises:

an error correction code decoder for receiving the data word and the error correction code stored in said storage register and for performing an error correction operation in connection therewith to generate an output data word, the output data word comprising a low-order output data word and a high-order output data word portion;

a low-order output portion for receiving the low-order output data word portion from said error correction code decoder; and a high-order output portion for receiving the high-order output data word portion from said error correction decoder, in which said high-order output portion comprises:

an encoder for receiving the high-order output data word portion stored in said high-order register and generating an encoded high-order data word portion, the high-order output data word portion having a number of concatenated bits HI BITS (i), "i" being an index, "i" one of said concatenated bits HI BITS (I) being asserted, the encoder generating an encoded high-order output data word portion having a binary-encoded value having a selected relation to index "I"; and a high-order output register for storing said encoded high-order output data word portion.

16. A method for storing digital data, the method comprising the steps of:

providing a storage register sized to store a predetermined number of bits;

receiving an input data word having a number of data bits;

generating an error correction code (ECC) value in response to all of the data bits of the input data word, said ECC value having a fixed number of error correction bits;

determining whether the number of data bits corresponding to the input data word in combination with the number of error correction bits corresponding to the ECC value exceed the predetermined number of bits of the storage register;

in response to determining an exceedance, creating a truncated data word by discarding from the input data word one or more preselected data bits such that the number of discarded data bits equals the exceedance;

concatenating the truncated data word with the ECC value, said concatenated truncated data word and ECC value having a total number of bits equal to the predetermined number of bits of the storage register; and storing the concatenated truncated data word and ECC value in the storage register.

17. The method of claim 16 wherein each discarded data bit from the input data word has a corresponding location, the method further comprising the steps of:

retrieving the concatenated truncated data word and ECC value from the storage register;

for each discarded data bit, inserting a corresponding phantom data bit location in the retrieved truncated data word, executing an ECC operation on the truncated data word with phantom data bit locations using the ECC value to correct errors in the truncated data word and to restore the discarded data bits represented by the phantom locations; and recovering the input data word.

\* \* \* \* \*